(12) United States Patent
Stoliaroff-Pepin et al.

(10) Patent No.: US 12,312,971 B2
(45) Date of Patent: May 27, 2025

(54) TURBOMACHINE FOR AN AIRCRAFT

(71) Applicant: SAFRAN AIRCRAFT ENGINES, Paris (FR)

(72) Inventors: Nicolas Stoliaroff-Pepin, Moissy-Cramayel (FR); Julien Fabien Patrick Becoulet, Moissy-Cramayel (FR); Maeva Daphné Gros-Borot, Moissy-Cramayel (FR); Paco Maurer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/838,100

(22) PCT Filed: Feb. 15, 2023

(86) PCT No.: PCT/FR2023/050200
§ 371 (c)(1),
(2) Date: Aug. 13, 2024

(87) PCT Pub. No.: WO2023/156733
PCT Pub. Date: Aug. 24, 2023

(65) Prior Publication Data
US 2025/0146427 A1    May 8, 2025

(30) Foreign Application Priority Data

Feb. 17, 2022 (FR) ...................................... 2201432

(51) Int. Cl.
*F01D 25/18*      (2006.01)
*F01D 5/08*       (2006.01)
(Continued)

(52) U.S. Cl.
CPC ............. *F01D 25/183* (2013.01); *F01D 5/08* (2013.01); *F01D 5/085* (2013.01); *F01D 11/02* (2013.01);
(Continued)

(58) Field of Classification Search
CPC ........ F01D 25/12; F01D 25/125; F01D 25/16; F01D 25/18; F01D 25/183; F01D 25/20;
(Continued)

(56) References Cited

U.S. PATENT DOCUMENTS

| 11,156,118 | B2 * | 10/2021 | Snowsill ................ F01D 25/16 |
| 11,220,929 | B2 * | 1/2022 | Brault .................... F01D 11/00 |
| 2022/0042460 | A1 | 2/2022 | Verdier et al. |

FOREIGN PATENT DOCUMENTS

| FR | 3 104 206 A1 | 6/2021 |
| GB | 2578522 A | 5/2020 |

OTHER PUBLICATIONS

International Search Report mailed Jun. 28, 2023, issued in corresponding International Application No. PCT/FR2023/050200, filed Feb. 15, 2023, 5 pages.
(Continued)

*Primary Examiner* — Kyle Robert Thomas
(74) *Attorney, Agent, or Firm* — CHRISTENSEN O'CONNOR JOHNSON KINDNESS PLLC

(57) ABSTRACT

A turbomachine includes a low-pressure shaft having an internal passage for a first air stream and a first segment. A second segment includes a first frustoconical portion, and an intermediate lubrication chamber wherein at least one bearing is arranged. The intermediate lubrication chamber is arranged in an intermediate casing. An annular air chamber is configured to be supplied with air from a low-pressure compressor and is at least partly axially delimited by the first frustoconical portion. A radial separating wall is mounted
(Continued)

around the first segment, and the first frustoconical portion further includes an opening to enable the first air stream to pass from the air chamber to the internal passage.

10 Claims, 6 Drawing Sheets

(51) Int. Cl.
*F01D 11/02* (2006.01)
*F01D 25/12* (2006.01)
*F01D 25/16* (2006.01)
*F01D 25/20* (2006.01)
*F02C 6/08* (2006.01)
*F02C 7/14* (2006.01)
*F02C 7/16* (2006.01)
*F02C 9/18* (2006.01)
*F02C 9/52* (2006.01)

(52) U.S. Cl.
CPC ........... *F01D 25/12* (2013.01); *F01D 25/125* (2013.01); *F01D 25/16* (2013.01); *F01D 25/18* (2013.01); *F01D 25/20* (2013.01); *F02C 6/08* (2013.01); *F02C 7/14* (2013.01); *F02C 7/16* (2013.01); *F02C 9/18* (2013.01); *F02C 9/52* (2013.01); *F05D 2220/323* (2013.01); *F05D 2240/54* (2013.01); *F05D 2240/55* (2013.01); *F05D 2260/98* (2013.01)

(58) Field of Classification Search
CPC . F01D 5/08; F01D 5/085; F01D 11/02; F02C 6/08; F02C 7/14; F02C 7/16; F02C 9/18; F02C 9/52; F05D 2220/323; F05D 2240/54; F05D 2240/55; F05D 2260/98
See application file for complete search history.

(56) References Cited

OTHER PUBLICATIONS

Written Opinion mailed Jun. 28, 2023, issued in corresponding International Application No. PCT/FR2023/050200, filed Feb. 15, 2023, 6 pages.

* cited by examiner

TURBOMACHINE FOR AN AIRCRAFT

TECHNICAL FIELD OF THE INVENTION

The invention relates to the technical field of turbomachine for aircrafts.

TECHNICAL BACKGROUND

An aircraft turbomachine generally extends along and around a longitudinal axis. It comprises a gas generator which typically comprises, from upstream to downstream, in the direction of gas flow in the turbomachine, a low-pressure compressor, a high-pressure compressor, a gas combustion chamber, a high-pressure turbine and a low-pressure turbine.

The low-pressure compressor rotor is typically connected to the rotor of the low-pressure turbine by means of a low-pressure shaft. The rotor of the high-pressure compressor is connected to the rotor of the high-pressure turbine by a high-pressure shaft. The high-pressure shaft is generally arranged coaxially around the low-pressure shaft.

The turbomachine also comprises a fan located upstream of the gas generator, which is driven in rotation about the longitudinal axis by a fan shaft. The fan shaft may be connected to the low-pressure shaft by means of a speed reducer.

The low-pressure shaft is guided in rotation by means of guide bearings, which must be lubricated to ensure that they operate correctly. The speed reducer also has gears and needs to be lubricated to ensure it works properly. Lubricating oil is therefore sprayed onto the guide bearings and into the reducer. In order to protect the associated members of the turbomachine from this lubricating oil, the low-pressure shaft guide bearings are typically arranged in lubrication chambers. The guide bearings located upstream of the turbomachine are located in an intermediate lubrication chamber, and the guide bearings located downstream of the turbomachine are arranged in a downstream lubrication chamber. The reducer may be located in an upstream lubrication chamber.

The lubrication chambers contain a pressurized lubricating oil mist that needs to be contained to prevent oil leaking out of the chambers and to protect the associated members of the turbomachine. The chambers are generally delimited by rotor walls or elements and stator walls or elements. In operation, it is therefore necessary to ensure a seal between the stator and rotor walls or elements.

This sealing is ensured by dynamic seals mounted between the stator elements or walls and the rotor elements or walls, which delimit the lubrication chambers in a sealed manner. To limit oil leaks outside the chamber through these seals, it is necessary to adjust the pressures between the inside and outside of the lubrication chambers. This requires pressurized air to be supplied to the seals. The air pressure outside the chamber must be higher than the pressure inside the chamber. The pressurized air from outside the chamber will therefore naturally pass through the seals and into the chamber, preventing oil from leaking from the chamber to the outside through the seals.

In the current technique, one solution for pressurizing the seals in the downstream lubrication chamber consists of extracting air from the upstream stages of the high-pressure compressor and directing this air axially to the seals in this chamber. However, this solution is not entirely satisfactory, as the air extracted from the upstream stages of the high-pressure compressor must pass through all the stages of the high-pressure compressor before reaching the downstream chamber. As a result, the temperature of this air rises during its journey and reaches a high temperature when it reaches the downstream lubrication chamber.

If the temperature of the air pressurizing the downstream lubrication chamber is too high, this is undesirable as it would encourage coking of the lubricating oil in the downstream lubrication chamber.

In this context, there is a need to provide a turbomachine that may seal the downstream lubrication chamber while limiting the risk of coking of the lubricating oil in this chamber.

SUMMARY OF THE INVENTION

To this end, the invention proposes a turbomachine for an aircraft, the turbomachine extending along a longitudinal axis and comprising:
  a low-pressure compressor comprising a compressor rotor,
  a low-pressure shaft for driving the compressor rotor, the low-pressure shaft being centered on the longitudinal axis and having an internal passage configured for the circulation of a first air stream along the longitudinal axis from upstream to downstream, the low-pressure shaft comprising:
  a first cylindrical segment,
  a second segment secured in rotation to the first segment and arranged upstream of the first segment, the second segment comprising a first frustoconical portion connected to the compressor rotor,
  an intermediate casing arranged around the first segment and downstream of the low-pressure compressor,
  at least one bearing for guiding the low-pressure shaft in rotation, arranged radially between the first segment and the intermediate casing,
  an annular intermediate lubrication chamber wherein said at least one bearing is arranged, the intermediate lubrication chamber being arranged in the intermediate casing,
  an annular air chamber configured to be supplied with air from the low-pressure compressor, the air chamber being delimited axially, at least in part, by the first frustoconical portion and a radial separating wall mounted around the first segment, the first frustoconical portion also having at least one opening putting the air chamber into communication with the internal passage to allow the first air stream to pass from the air chamber to the internal passage.

Thanks to the internal passage of the low-pressure shaft, it is possible to circulate the first stream of air extracted from the low-pressure compressor from upstream to downstream. This first air stream may be used to pressurize the downstream lubrication chamber. Thanks to this configuration, it is no longer necessary to pass through the high-pressure compressor stages. The temperature of the first air stream is then maintained at a suitable temperature to limit coking of the oil in this lubrication chamber.

In addition, according to the invention, the low-pressure shaft has first and second segments. The first segment is configured to be connected to the low-pressure turbine and the second segment is connected to the low-pressure compressor. Thanks to the presence of a first cylindrical segment connected to the low-pressure turbine and a second frustoconical segment equipped with the opening and connected to the low-pressure compressor, it is possible to ensure that the first air stream enters the internal passage without piercing the first segment. This meets the mechanical integration constraints of the low-pressure shaft connected to the low-pressure turbine without impacting the performance of the turbomachine. A drilling of the part of the low-pressure shaft connected to the low-pressure turbine means locally over-sizing the thickness of the low-pressure shaft at the level of the drilling to maintain sufficient mechanical strength of the shaft. However, as the low-pressure shaft is configured to be arranged inside the high-pressure shaft, a local extra thickness of the low-pressure shaft requires the diameter of the high-pressure shaft to be increased or the clearances between the two shafts to be reduced. The turbomachine performance is reduced in this configuration. The invention overcomes these disadvantages.

In addition, by eliminating the need for drilling in the first segment, it is not necessary to provide dynamic seals (e.g. labyrinth seals) between this first segment and the high-pressure shaft to limit leakage through this drilling, which allows to reduce the number of seals in this area and therefore improves the reliability of the assembly.

The invention may comprise one or more of the following characteristics, taken alone or in combination with each other:
- the air chamber is delimited externally, at least in part, by a first axial wall extending axially upstream from the separating wall and a second axial wall connected to the first frustoconical portion and extending axially downstream, the first and second walls axially delimiting between them an air inlet to allow the first air stream to pass from the low-pressure compressor inside the air chamber,
- a stationary annular air cavity arranged around the air chamber, the air cavity opening into the air chamber and being supplied with air from the low-pressure compressor,
- the air cavity is delimited axially, at least in part, by a dynamic seal housed radially between the first axial wall and the intermediate casing, and a dynamic seal housed radially between the second axial wall and the intermediate casing,
- a drainage cavity arranged axially between the intermediate lubrication chamber and the air cavity,
- the drainage cavity is delimited axially by the dynamic seal housed radially between the first axial wall and the intermediate casing, and a dynamic seal housed radially between the first axial wall and the intermediate casing and separating the drainage cavity from the intermediate lubrication chamber,
- a high-pressure compressor arranged downstream of the intermediate casing and comprising a compressor rotor,
- a high-pressure shaft arranged coaxially around the first segment of the low-pressure shaft and connected to the compressor rotor, the first segment and the high-pressure shaft delimiting an annular space for the circulation of a second air stream from downstream to upstream, the high-pressure shaft comprising a radial opening opening into the annular space for the passage of the second air stream from the outside to the inside of the annular space,
- a sleeve arranged around the first segment and inside the intermediate casing, the sleeve being secured to the separating wall and axially delimiting, with an upstream end of the high-pressure shaft, an aperture for the passage of the second air stream from the annular space to the intermediate lubrication chamber,
- a fan movable in rotation about the longitudinal axis and arranged upstream of the low-pressure compressor,
- a fan shaft connected to the fan,
- a speed reducer connecting the fan shaft to the low-pressure shaft, the speed reducer being arranged in an upstream lubrication chamber, and the second segment comprising a radial wall extending outwards from the first frustoconical portion and connecting the first frustoconical portion to the compressor rotor, the radial wall having an axial hole for the passage of air from the air chamber to the upstream lubrication chamber,
- a speed reducer connecting the fan shaft to the low-pressure shaft, the speed reducer being arranged in an upstream lubrication chamber, the second segment comprising a second frustoconical portion connected to the speed reducer and to the first frustoconical portion, the second frustoconical portion having a hole opening into the internal passage for the passage of air from the air chamber to the upstream lubrication chamber.

BRIEF DESCRIPTION OF THE FIGURES

Further characteristics and advantages will be apparent from the following description of a non-limiting embodiment of the invention with reference to the appended drawings wherein.

DETAILED DESCRIPTION OF THE INVENTION

Figure 1:
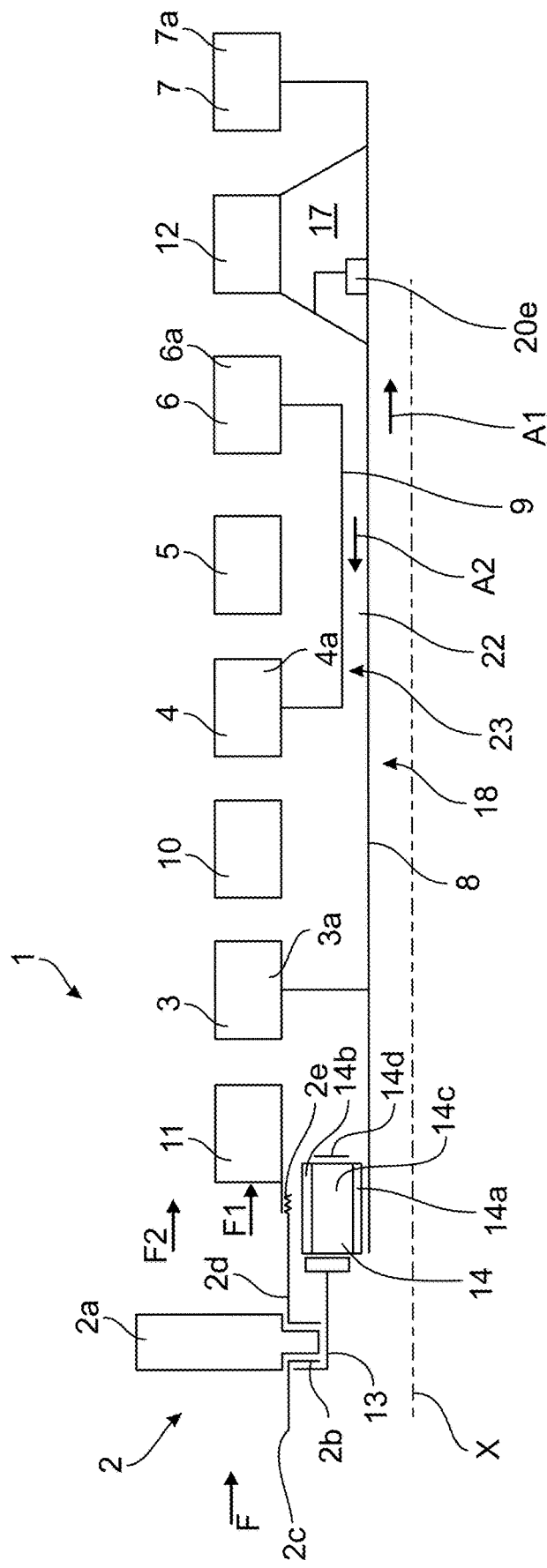
FIG. 1 is a schematic longitudinal sectional view of a half-turbomachine according to the invention.

An example of an aircraft turbomachine 1 according to the invention is shown very briefly in FIG. 1. The turbomachine 1 is, for example, a turbofan engine.

The turbomachine 1 extends along a longitudinal axis X. A gas stream F flows through the turbomachine 1.

For the purposes of the present invention, the terms "upstream" and "downstream" are understood in relation to the direction of flow of the gas stream F in the turbomachine 1.

Furthermore, the terms "longitudinal", "longitudinally", "radial" and "radially" refer to the longitudinal axis X of the turbomachine. The terms "outside" and "inside" are relative to the distance from the longitudinal axis X along a radial axis perpendicular to the longitudinal axis X.

The turbomachine 1 comprises, from upstream to downstream, a fan 2 and a gas generator. The gas generator comprises, from upstream to downstream, a low-pressure compressor 3, a high-pressure compressor 4, a combustion chamber 5, a high-pressure turbine 6 and a low-pressure turbine 7.

The turbomachine 1 also comprises an intermediate casing 10, arranged axially downstream of the low-pressure compressor 3, between the low-pressure compressor 3 and the high-pressure compressor 4. The intermediate casing 10 comprises, for example, an internal shell and an external shell which are centered on the longitudinal axis X. The internal and external shells are connected by arms, for example.

The turbomachine 1 may also comprise an inlet casing 11. The inlet casing 11 is arranged axially between the fan 2 and the low-pressure compressor 3. The inlet casing 11 comprises, for example, an internal shell and an external shell which are centered on the longitudinal axis X. The internal and external shells are connected by arms, for example. The turbomachine 1 may also comprise an inter-turbine casing 12. The inter-turbine casing 12 is arranged axially between the high-pressure turbine 6 and the low-pressure turbine 7.

Each compressor 3, 4 comprises a compressor rotor 3a, 4a and each turbine 6, 7 comprises a turbine rotor 6a, 7a. The compressor rotors 3a, 4a and turbine rotors 6a, 7a are made up of a plurality of stages, each comprising a bladed wheel.

The compressor rotor 3a of the low-pressure compressor 3 is connected to the turbine rotor 7a of the low-pressure turbine 7 by a low-pressure shaft 8. They form a low-pressure body. The compressor rotor 4a of the high-pressure compressor 4 is connected to the turbine rotor 6a of the high-pressure turbine 6 by a high-pressure shaft 9. They form a high-pressure body.

The low-pressure shaft 8 and high-pressure shaft 9 are centered on the longitudinal axis X and movable in rotation about the longitudinal axis X. The high-pressure shaft 9 is arranged coaxially around the low-pressure shaft 8.

The gas stream F passes through the fan 2 and divides into a primary air stream F1 passing through a primary vein and a secondary air stream F2 passing through a secondary vein surrounding the primary vein. The primary vein is bounded at least in part by the internal and external shells. The primary air stream F1 passes through the low-pressure compressor 3 and the high-pressure compressor 4. The compressed primary air stream F1 then passes through the combustion chamber 5, where it is mixed with a fuel. The gases produced by combustion pass through the high-pressure turbine 6 and the low-pressure turbine 7. The energy in the gases is converted by the turbine rotor 7a of the low-pressure turbine 7 into mechanical energy allowing to drive in rotation the low-pressure shaft 8 and consequently the low-pressure compressor 3.

The fan 2 comprises a disk 2b movable in rotation about the longitudinal axis X and vanes 2a evenly distributed over the disk 2b. The disk 2b may be connected upstream to an inlet cone 2c and downstream to a rear ring 2d. One end of the rear ring 2d is mounted inside the inlet casing 11. A sealing element 2e is mounted radially between the rear ring 2d and the inlet casing 11. The sealing element 2e is, for example, a dynamic seal such as a labyrinth seal. It comprises wipers carried by the rear ring 2d which cooperate with the internal casing 11.

The disk 2b is driven in rotation by a fan shaft 13. Advantageously, the fan shaft 13 is connected to the low-pressure shaft 8 by means of a speed reducer 14. The speed reducer 14 is of mechanical type. For example, it may have an epicyclic or planetary train gear. The speed reducer 14 typically comprises a sun gear 14a and a ring gear 14b centered on the longitudinal axis X. It also comprises planet gears 14c meshing with the sun gear 14a and the ring gear 14b. It also comprises a planet carrier 14d.

The sun gear 14a is secured in rotation to the low-pressure shaft 8 and forms the input of the speed reducer 14, while one or other of the ring gear 14b and the planet carrier 14d, depending on the configuration of the speed reducer 14, is secured in rotation to the fan shaft 13 and forms the output of the speed reducer 14. In an epicyclic gear train configuration (not shown), the ring gear 14b is stationary and therefore secured to a stationary part of the turbomachine, such as the inlet casing 11, and the planet carrier 14d is movable in rotation and is therefore integral to the fan shaft 13. In a planetary gear train configuration as shown in FIG. 1, the ring gear 14b is movable in rotation and is therefore secured to the fan shaft 13, and the planet carrier 14d is stationary and is therefore secured to a stationary part of the turbomachine such as the inlet casing 11.

The speed reducer 14 allows the fan shaft 13 to be driven at a lower speed than the speed of rotation of the low-pressure shaft 8. This allows to increase the bypass ratio of the turbomachine 1.

Figure 2:
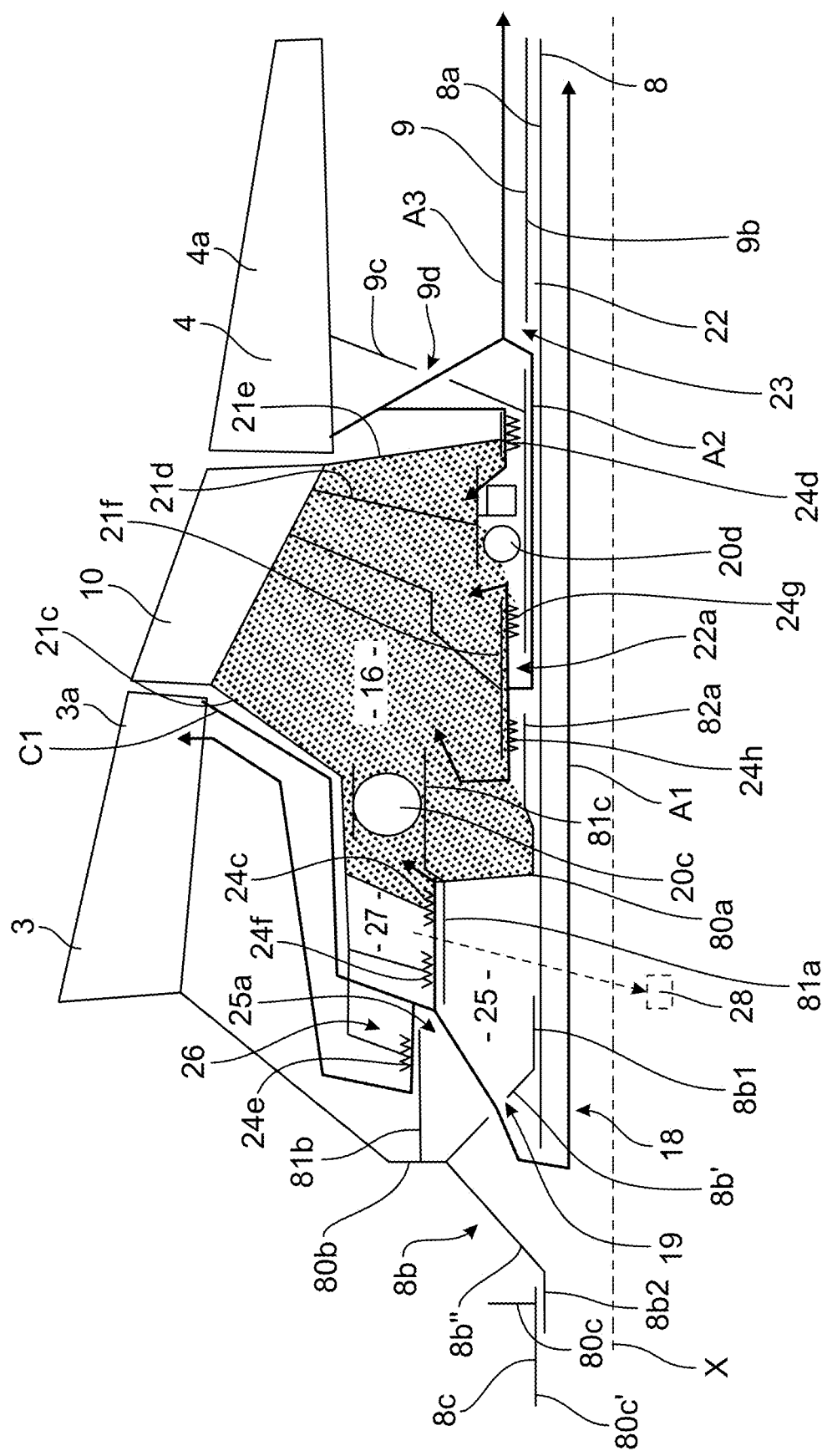
FIG. 2 is a detail view of a longitudinal section of part of the half-turbomachine shown in FIG. 1.
Figure 3:
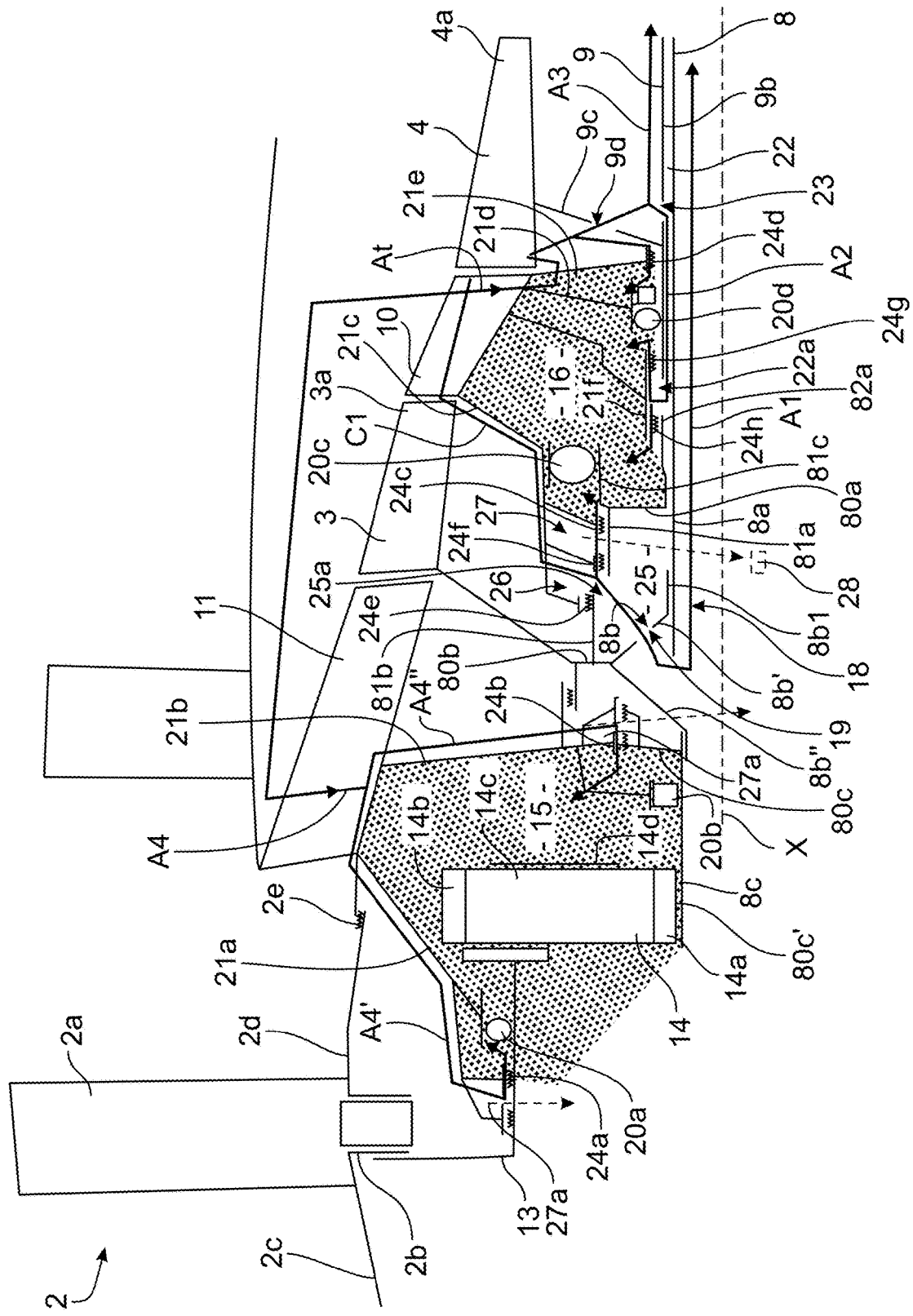
FIG. 3 is a longitudinal sectional view of a first embodiment of the invention.

As may be seen more clearly in FIG. 2 or FIG. 3, the low-pressure shaft 8 according to the invention has an internal passage 18 configured for the circulation of a first air stream A1 along the longitudinal axis X. In particular, the first air stream A1 circulates in the internal passage 18 from upstream to downstream along the longitudinal axis X. The first air stream A1 comes from the low-pressure compressor 3.

The low-pressure shaft 8 also comprises, from downstream to upstream, a first segment 8a connected, for example, to the turbine rotor 7a of the low-pressure turbine 7, a second segment 8b connected to the compressor rotor 3a of the low-pressure compressor 3 and optionally a third segment 8c connected, for example, to the speed reducer 14. Preferably, the low-pressure shaft 8 is made up of at least two parts that are connected to each other and secured in rotation. In particular, the first and second segments 8a, 8b may be detachably connected to each other so that the high-pressure body may be assembled around the low-pressure body of the turbomachine 1.

The first, second and third segments 8a, 8b and 8c are hollow for the passage of the first air stream A1 and each define a section of the internal passage 18.

The first segment 8a is cylindrical. However, the first segment 8a may, for example, have variations in its cross-section in the longitudinal direction. The downstream end of the first segment 8a is connected to the turbine rotor 7a of the low-pressure turbine 7 and the opposite upstream end is connected to the second segment 8b.

According to the invention, the low-pressure shaft 8 comprises a radial separating wall 80a mounted around the first segment 8a. The separating wall 80a is rotationally secured to the first segment 8a. The separating wall 80a, for example, is located inside the intermediate casing 10. The separating wall 80a carries a first axial wall 81a extending axially upstream from the separating wall 80a.

Advantageously, the low-pressure shaft 8 also comprises a sleeve 82a arranged around the first segment 8a and inside the intermediate casing 10. The sleeve 82a is secured in rotation to the first segment 8a. The sleeve 82a is mounted around the first segment 8a and is connected to it by a splined connection, for example. The sleeve 82a is arranged downstream of the separating wall 80a and is connected to the separating wall 80a. The sleeve 82a and the separating wall 80a may form a one-part piece mounted around the first segment 8a by means of the spline connection, for example. Advantageously, the sleeve 82a is cylindrical.

The second segment 8b is secured in rotation to the first segment 8a and is connected to the latter by a mechanical link, for example of the spline type. It comprises a first frustoconical portion 8b' and optionally a second frustoconical portion 8b".

The first frustoconical portion 8b' is flared upstream. According to the invention, the first frustoconical portion 8b' has an opening 19. The opening 19 opens onto the outside and inside of the first frustoconical portion 8*b'*. The opening 19 thus opens into the internal passage 18. The opening 19 has a radial axis.

As shown in FIG. 2, the second segment 8*b* may also comprise a first cylindrical portion 8*b*1 secured to the first frustoconical portion 8*b'*. The second segment 8*b* is connected to the upstream end of the first segment 8*a* by means of the first cylindrical portion 8*b*1, which is for example equipped with splines for this purpose. The upstream end of the first segment 8*a* is open. It opens into the second segment 8*b* and in particular the first cylindrical portion 8*b*1 or the first frustoconical portion 8*b'*.

The second frustoconical portion 8*b''* is flared downstream. It is secured to the first frustoconical portion 8*b'*. Each frustoconical portion 8*b'*, 8*b''* has an annular radial surface centered on the longitudinal axis X, the junction of the two radial surfaces forming an annular rim. The second frustoconical portion 8*b''* is also connected to the third segment 8*c*.

In addition, advantageously, the second segment 8*b* comprises a radial wall 80*b* extending radially outwards from the first frustoconical portion 8*b'* and in particular from the annular rim. The radial wall 80*b* connects the first frustoconical portion 8*b'* to the compressor rotor 3*a* of the low-pressure compressor 3. A second axial wall 81*b* connected to the first frustoconical portion 8*b'*. More particularly, the second axial wall 81*b* is carried by the radial wall 80*b* and extends axially downstream from this radial wall 80*b*.

The second frustoconical portion 8*b''*, for example, is secured to the downstream end of the third segment 8*c*.

As shown in FIG. 2, the second segment 8*b* also comprises a second cylindrical portion 8*b*2 secured to the second frustoconical portion 8*b''*. The second segment 8*b* is attached to the downstream end of the third segment 8*c* by means of the second cylindrical portion 8*b*2. The second cylindrical portion 8*b*2, for example, is attached to the inside of the downstream end of the third segment 8*c* by means of splines.

Advantageously, the third segment 8*c* is arranged inside the inlet casing 11. The third segment 8*c* has a cylindrical body 80*c'* which extends between the upstream and downstream ends of the third segment 8*c*. The third segment 8*c* is connected to the sun gear 14*a* of the speed reducer 14. In particular, the upstream end of the third segment 8*c* is connected to the sun gear 14*a*. Advantageously, the third segment 8*c* comprises a support wall 80*c* extending radially outwards from the cylindrical body 80*c'* and in particular from the downstream end of the cylindrical body 80*c'*.

In addition, the high-pressure shaft 9 is advantageously arranged coaxially around the first portion 8*a* of the low-pressure shaft 8 and together they define an annular space 22 for the circulation of a second air stream A2 from downstream to upstream.

The high-pressure shaft 9 comprises, for example, a cylindrical body 9*b* and a frustoconical skirt 9*c* extending radially outwards from the cylindrical body 9*b*. The frustoconical skirt 9*c* is connected to the compressor rotor 4*a* of the high-pressure compressor 4. The frustoconical skirt 9*c* has a bore 9*d*.

The high-pressure shaft 9 also comprises a radial opening 23. The radial opening 23 opens inside and outside the high-pressure shaft 9. It thus opens into the annular space 22. By "radial opening", it is understood that the axis of the opening extends radially with respect to the longitudinal axis X. The radial opening 23 is formed on the cylindrical body 9*b*. For example, it is located downstream of the frustoconical skirt 9*c*.

In addition, the high-pressure shaft 9 is more particularly arranged downstream of the sleeve 82*a*. Together with the sleeve 82*a*, the high-pressure shaft 9 axially defines an aperture 22*a* opening into the annular space 22.

The low and high pressure shafts 8, 9 of the turbomachine 1 are guided in rotation by bearings. The bearings are, for example, rolling bearings such as rollers or balls.

As shown in FIGS. 3 to 6, the fan shaft 13 is guided in rotation by a first guide bearing 20*a*. The first bearing 20*a* is arranged radially between the fan shaft 13 and the inlet casing 11. The first bearing 20*a* comprises, for example, a rolling bearings arranged between an external ring and an internal ring. The external ring is carried by a first bearing support 21*a* extending radially inwards from the inlet casing 11. The internal ring is carried by the fan shaft 13. The rolling bearing is, for example, a row of balls. Advantageously, the rolling bearing comprises two rows of balls.

The low-pressure shaft 8 is guided in rotation by a second and a third bearing 20*b*, 20*c*. The second bearing 20*b* is arranged radially between the inlet casing 11 and the low-pressure shaft 8, in particular the third segment 8*c*. The second bearing 20*b* comprises, for example, a rolling bearing arranged between an external ring and an internal ring. The external ring is carried, for example, by a second bearing support 21*b* extending radially inwards from the inlet casing 11. The internal ring is carried by the third segment 8*c*, for example. The rolling bearing is, for example, a row of rollers. The third bearing 20*c* is arranged radially between the intermediate casing 10 and the first segment 8*a*. Referring for example to FIG. 2, the third bearing 20*c* comprises a rolling bearing, for example a row of balls, arranged radially between an internal ring and an external ring. The external ring is carried by a third bearing support 21*c* connected to the intermediate casing 10. The internal ring is carried by a third axial wall 81*c* extending axially downstream from the separating wall 80*a*.

The high-pressure shaft 9 is guided in rotation by a fourth bearing 20*d*. The fourth bearing 20*d*, for example, is arranged radially between the high-pressure shaft 9 and the intermediate casing 10. The fourth bearing 20*d* comprises a rolling bearing, for example a row of balls and a row of rollers arranged radially between an external ring and an internal ring. The internal ring is carried by the high-pressure shaft 9 and in particular the cylindrical body 9*b* and the external ring is carried by a fourth bearing support 21*d* connected to the intermediate casing 10.

As shown in FIG. 1, the low-pressure shaft 8 may be guided in rotation downstream by a fifth bearing 20*e* arranged radially between a downstream end of the low-pressure shaft 8 and the inter-turbine casing 12, for example.

The bearings 20*a*, 20*b*, 20*c*, 20*d*, 20*e* and the speed reducer 14 must be lubricated with oil to ensure that they operate correctly. In order not to contaminate the associated members of the turbomachine 1 with oil, the bearings 20*a*, 20*b*, 20*c*, 20*d*, 20*e* and the speed reducer 14 are arranged in lubrication chambers.

To this end, the turbomachine 1 also comprises an upstream lubrication chamber 15 wherein the first and second bearings 20*a*, 20*b* and the speed reducer 14 are arranged, an intermediate lubrication chamber 16 wherein the third and fourth bearings 20*c*, 20*d* are arranged, and a downstream lubrication chamber 17 wherein the fifth bearing 20*e* is arranged.

The lubrication chambers 15, 16, 17 are annular.

The upstream lubrication chamber 15 is located, for example, inside the inlet casing 11 and in particular inside the internal shell.

The intermediate lubrication chamber 16 is located inside the intermediate casing 10. It is bounded internally at least in part by the low pressure shaft 8, in particular the sleeve 82a, and by the high pressure shaft 9.

The downstream lubrication chamber 17 is located, for example, inside the inter-turbine casing 12.

Each lubrication chamber 15, 16, 17 is supplied with oil by at least one lubrication circuit (not shown). Each lubrication chamber 15, 16, 17 contains a pressurized oil mist.

In order to limit oil leakage outside the chambers 15, 16, 17, dynamic seals such as labyrinth seals are arranged at the axial ends of the chambers 15, 16, 17. A dynamic seal is an assembly that limits fluid leakage between a stationary part and a rotating part.

With reference to FIGS. 3 to 6, the upstream chamber 15 is axially delimited by a first seal 24a of the dynamic type, for example with a labyrinth, and a second seal 24b of the dynamic type, for example with a labyrinth. The first seal 24a delimits the upstream end of the upstream chamber 15 and the second seal 24b delimits the downstream end of the upstream chamber 15. The first seal 24a is located upstream of the first bearing 20a. It comprises an external ring carried by the first bearing support 21a and an internal ring carried by the fan shaft 13. The internal ring is coated with wipers that work in conjunction with the external ring. The second seal 24b is located downstream of the second bearing 20b. It comprises an external ring carried by the second bearing support 21b and an internal ring carried by the low-pressure shaft 8, in particular the third segment 8c and in particular the radial support wall 80c. The internal ring is coated with wipers that work in conjunction with the external ring.

The intermediate chamber 16 is axially delimited by a third seal 24c of the dynamic type, for example with a labyrinth, and a fourth seal 24d of the dynamic type, for example with a labyrinth. The third seal 24c delimits the upstream end of the intermediate chamber 16 and the fourth seal 24d delimits the downstream end of the intermediate chamber 16. The third seal 24c is located upstream of the third bearing 20c. It comprises an external ring carried by the third bearing support 21c and an internal ring carried by the low-pressure shaft 8 and in particular the first segment 8a, in particular the first axial wall 81a. The internal ring may be coated with wipers that work in conjunction with the external ring. The fourth seal 24d is located downstream of the fourth bearing 20d. More specifically, the fourth seal 24d is arranged axially between the radial opening 23 and the fourth bearing 20d. It comprises an external ring carried by a first radial arm 21e extending radially inwards from the intermediate casing 10 and an internal ring carried by the high-pressure shaft 9. The internal ring may be coated with wipers that work in conjunction with the external ring.

The aperture 22a leads into the intermediate lubrication chamber 16. To prevent oil leaking from the intermediate lubrication chamber 16 into the annular space 22 through the aperture 22a, a first dynamic sealing member 24g and a second dynamic sealing member 24h are arranged axially on either side of the aperture 22a. The first sealing member 24g is housed radially between the intermediate casing 10 and an upstream end of the high-pressure shaft 9 and the second dynamic sealing member 24h is housed radially between the first segment 8a and the intermediate casing 10. The fourth bearing 20d is arranged axially between the fourth seal 24d and the first sealing member 24g. The first sealing member 24g is a labyrinth seal. It comprises an external sealing ring 21f connected to the intermediate casing 10 and an internal ring carried by the upstream end of the high-pressure shaft 9. The external ring 21f is arranged around the aperture 22a.

The internal ring is coated with wipers that cooperate with the external ring 21f. The second sealing member 24h comprises an internal ring carried by the first segment 8a and in particular the sleeve 82a. The internal ring is coated with wipers that cooperate with the external sealing ring 21f. The external ring 21f is arranged around the aperture 22a.

The turbomachine 1 also comprises an air chamber 25 delimited axially at least in part by the first frustoconical portion 8b' and the separating wall 80a. The separating wall 80a thus advantageously separates the intermediate lubrication chamber 16 and the air chamber 25. The air chamber 25 is also delimited externally at least in part by the first axial wall 81a and the second axial wall 81b. The air chamber 25 is arranged radially between the first and second axial walls 81a, 81b and the first segment 8a.

The air chamber 25 also comprises an air inlet 25a. The air inlet 25a is delimited or defined between the first axial wall 81a and the second axial wall 81b. The air chamber 25 therefore rotates.

The air chamber 25 is supplied with air from the low-pressure compressor 3. According to the present invention, the air chamber 25 may be supplied directly or indirectly with air from the low-pressure compressor 3. Directly means that the air from the low-pressure compressor 3 is communicated directly to the air chamber 25, while indirectly means that the air from the low-pressure compressor 3 is communicated to an intermediate member which in turn supplies the air chamber 25.

The air chamber 25 communicates with the internal passage 18 via the opening 19, allowing the first air stream A1 to pass from the air chamber 25 to the internal passage 18.

Advantageously, the turbomachine 1 also comprises an air cavity 26 arranged around the air chamber 25. The air cavity 26 is stationary against rotation about the longitudinal axis X. The air cavity 26 is arranged inside the third bearing support 21c. It is axially delimited by a fifth dynamic seal 24e, for example a labyrinth seal, and a sixth dynamic seal 24f, for example a labyrinth seal. The fifth seal 24e comprises an external ring carried by the third bearing support 21c and an internal ring carried by the second axial wall 81b. The internal ring is coated with wipers that work in conjunction with the external ring. The sixth seal 24f comprises an external ring carried by the third bearing support 21c and an internal ring carried by the first axial wall 81a. The air cavity 26 opens into the air chamber 25 via the air inlet 25a. The third bearing support 21c may advantageously carry a tube (not shown) opening into the air cavity 26. The tube allows to convey air from the low-pressure compressor 3 to the air cavity 26.

The air cavity 26 is therefore supplied with air extracted from the low-pressure compressor 3, and the air chamber 25 is supplied with air from the low-pressure compressor 3 via the air cavity 26. The air cavity 26 allows to homogenize the air pressure around the third seal 24c and thus improve the sealing of the intermediate lubrication chamber 16.

Slight oil leaks from the intermediate lubrication chamber may occur. To this end, the turbomachine 1 advantageously also comprises a drainage cavity 27 arranged axially between the air cavity 26 and the intermediate lubrication chamber 16. The drainage cavity 27 is delimited axially by the sixth seal 24f and the third seal 24c. The third seal thus axially separates the drainage cavity 27 from the intermediate lubrication chamber 16. The drainage cavity 27 is arranged inside the third bearing support 21c and delimited internally by the low-pressure shaft 8, and in particular the first segment 8a, in particular the first axial wall 81a.

The drainage cavity 27 allows oil leaks from the intermediate lubrication chamber 16 to be stored and evacuated outside the drainage chamber 27. The drainage cavity 27 thus prevents oil leaking into the air chamber 25.

The turbomachine 1 may comprise additional drainage cavities 27a at the terminals of the upstream lubrication chamber 15.

The turbomachine 1 also comprises a drainage circuit comprising a first drainage duct (not shown) which allows oil to be recovered from the drainage cavity 27 and this oil (not shown) to be evacuated to an oil receptacle 28 or to the outside of the turbomachine 1. The oil receptacle 28 is located, for example, in an inter-vein compartment between the primary vein and the secondary vein, or in the lower part of a nacelle of the turbomachine 1.

The turbomachine 1 also comprises a pressurization circuit C1. The pressurization circuit C1 comprises an air extracting member (not shown) configured to extract air from the low-pressure compressor 3, and in particular downstream of the low-pressure compressor 3. "Downstream of the compressor" means that the air is extracted from the last stages of the low-pressure compressor 3, i.e. the stages located downstream of a middle stage located at an intermediate distance between the first and the last stage of the low-pressure compressor 3.

The pressurization circuit C1 comprises the first air stream A1. The first air stream A1 allows to pressurize the downstream chamber 17. The first air stream A1 is extracted in by the extracting member. The first air stream A1 is directed towards the air chamber 25 via the air cavity 26 and circulates into the internal passage 18 via the opening 19. The first air stream A1 circulates from upstream to downstream through the internal passage 18 to the downstream lubrication chamber 17.

Figure 4:
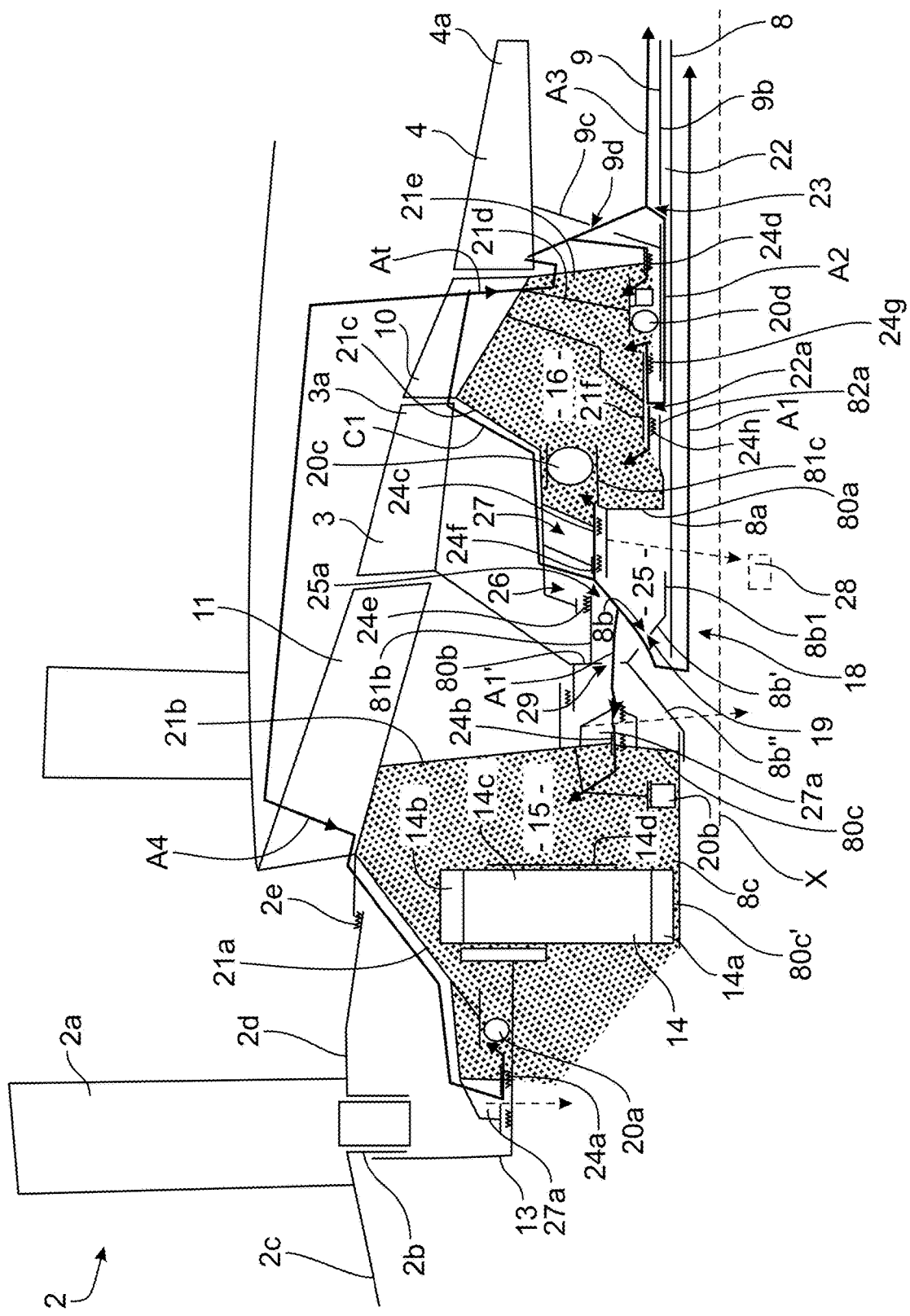
FIG. 4 is a longitudinal sectional view of a variant of embodiment of FIG. 3.

According to an embodiment shown in FIGS. 3 and 4, the pressurization circuit C1 comprises an additional air stream At extracted by the extracting member. The pressurization circuit C1 advantageously comprises a duct with an inlet connected to the extracting member and an outlet opening upstream of the high-pressure compressor 4.

Advantageously, the duct passes through one of the arms of the intermediate casing 10. The additional air stream At is conveyed into the duct and is directed radially towards the cylindrical segment 9b via the drilling 9d. It then divides into a second air stream A2 for pressurizing the first and second sealing members 24g, 24h and a third air stream A3 for cooling the compressor rotor 4a of the high-pressure compressor 4.

The second air stream A2 passes through the radial opening 23 and is directed into the annular space 22. It circulates from downstream to upstream in the annular space 22 to the intermediate sealing chamber 16 via the aperture 22a.

The third air stream A3 circulates around the high-pressure shaft 9 from upstream to downstream and allows the compressor rotor 4a of the high-pressure compressor 4 to be cooled.

Figure 5:
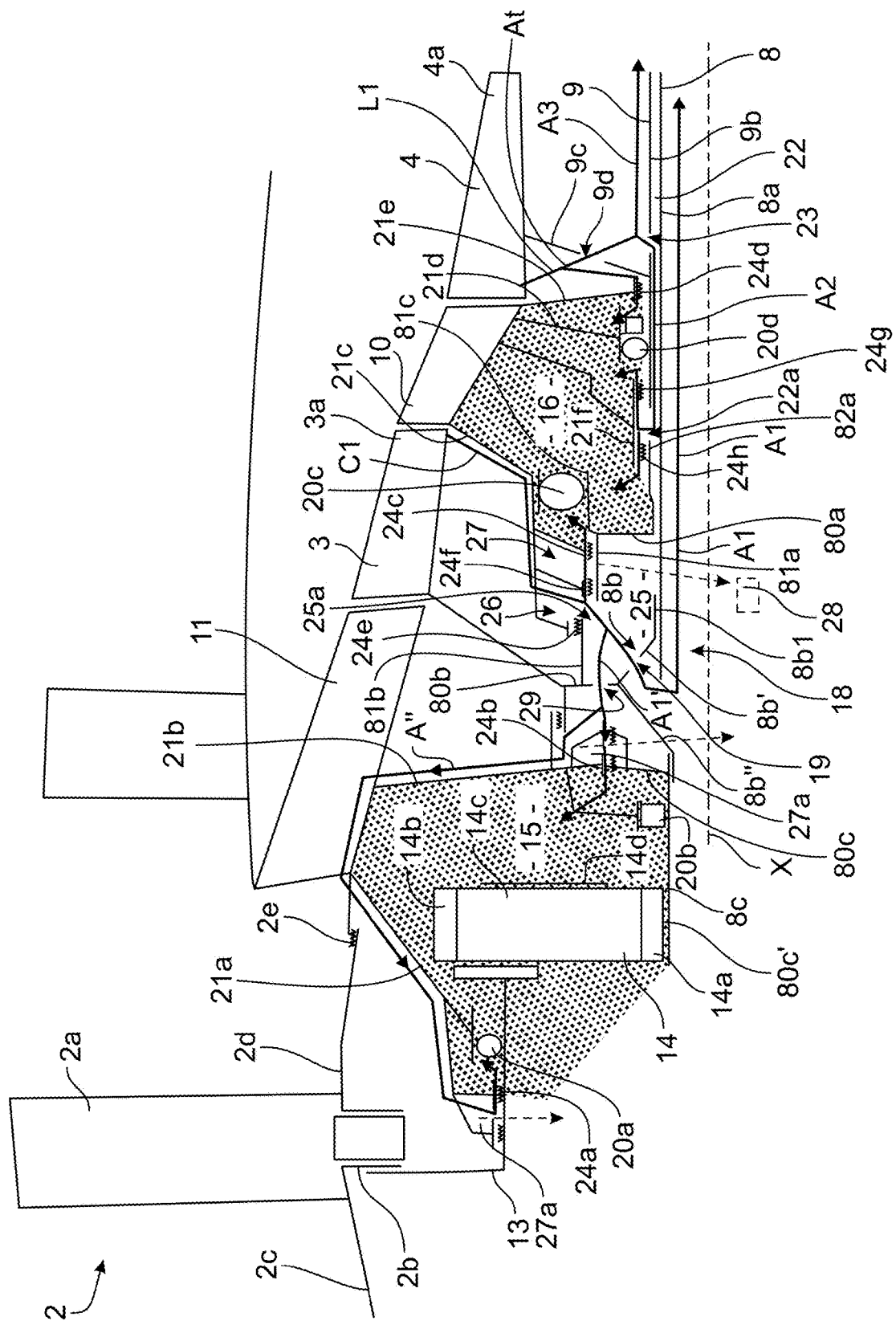
FIG. 5 is a longitudinal sectional view of another variant of embodiment of FIG. 3.
Figure 6:
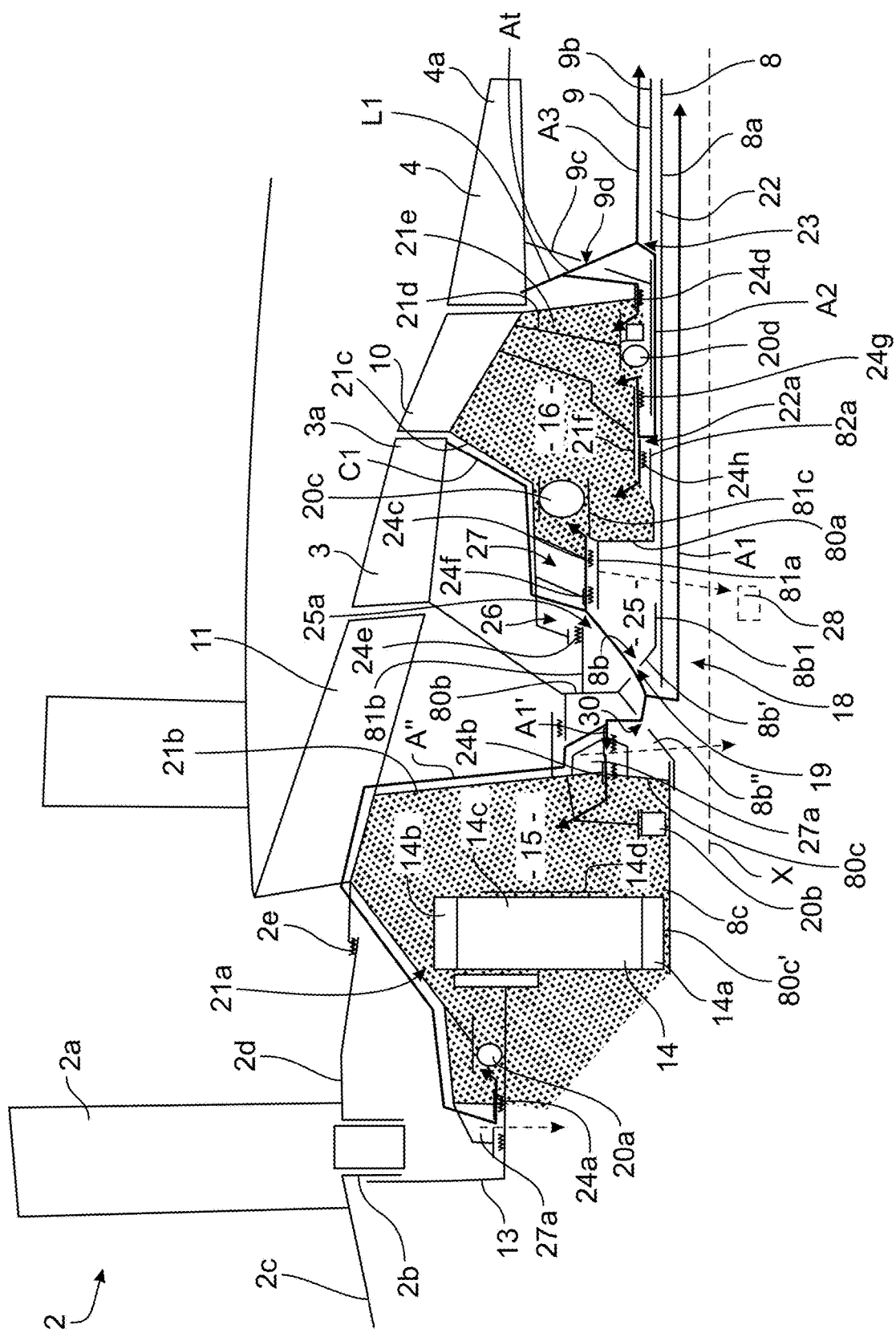
FIG. 6 is a longitudinal sectional view of another variant of embodiment of FIG. 3.

Alternatively, for cooling the high-pressure compressor 4 and pressurizing the first and second sealing members 24g, 24h, with reference to FIGS. 5 and 6, the turbomachine 1 advantageously comprises a cooling circuit L1. The cooling circuit L1 comprises an air extracting member (not shown) configured to extract air from the high-pressure compressor 4, in particular upstream of the high-pressure compressor 4.

The cooling circuit L1 comprises the additional air stream At extracted by the air extracting member of the high-pressure compressor 4. The additional air stream At is divided into a second air stream A2 and a third air stream A3.

The second air stream A2 is directed into the annular space 22 through the radial opening 23 and circulates from downstream to upstream in the annular space 22 as far as the intermediate sealing chamber 16 via the aperture 22a for pressurization of the first and second sealing members 24g, 24h.

The third air stream A3 circulates around the high-pressure shaft 9 from upstream to downstream and allows the rotor of the high-pressure compressor 4a to be cooled.

In addition, with reference to FIG. 3, the pressurization circuit C1 comprises a fourth air stream A4 for pressurizing the upstream lubrication chamber 15. The fourth air stream A4 is extracted from the low-pressure compressor 3 by the extracting member. Advantageously, the pressurization circuit C1 comprises a duct with an inlet connected to the extracting member and an outlet opening out inside the inlet casing 11. Advantageously, the duct passes through one of the arms of the inlet casing 11. The air stream A4 is divided into an upstream stream A4' for pressurizing the first seal 24a and a downstream stream A4" for pressurizing the second seal 24b.

Alternatively, with reference to FIG. 4, an axial hole 29 is formed in the radial wall 80b and is configured to axially conduct a part A1' of the first air stream A1 from the air chamber 25 to the upstream lubrication chamber 15. The part A1' of the first air stream A1 pressurizes the second seal 24b. Alternatively, the hole 29 is formed in the second frustoconical portion 8b".

Alternatively, as shown in FIG. 5, the part A1' of the first air stream A1 also allows to pressurize the first seal 24a. To this end, the pressurization circuit C1 comprises a duct arranged in the internal shell of the inlet casing 11 and which opens into the interior of the inlet casing 11. A portion A1" of the part A1' of the first air stream A1 is directed into the duct and allows to pressurize the first seal 24a.

This embodiment is particularly advantageous as there are no ducts running through the arms of the inlet casing. The arms of the inlet casing may therefore be sized to minimize disturbance to the flow of the primary stream F1. The aerodynamic performance of the turbomachine 1 is therefore improved. Indeed, when the duct is arranged in at least one arm, it may be necessary to adapt the dimensions of the arm to accommodate such a duct, which then penalizes the aerodynamic performance of the turbomachine.

According to a further alternative shown in FIG. 6, the second frustoconical portion 8b" has a hole 30 which is configured to conduct the part A1' of the first air stream A1 from the air chamber 25 to the upstream lubrication chamber 15. The part A1' of the first air stream A1 pressurizes the second seal 24b.

According to this alternative, the part A1' of the first air stream A1 also allows to pressurize the first seal 24a. To this end, the pressurization circuit C1 comprises a duct arranged in the internal shell of the inlet casing 11. A portion A1" of the part A1' of the first air stream A1 is directed into the duct and allows to pressurize the first seal 24a.

Thus, thanks to the internal passage 18 in the low-pressure shaft, it is possible to circulate the first air stream A1 extracted from the low-pressure compressor 3 as far as the downstream lubrication chamber 17, thus allowing to maintain an adequate temperature of the pressurization air in this downstream lubrication chamber to prevent coking of the oil.

In addition, thanks to the presence of a first cylindrical segment 8a connected to the low-pressure turbine 7 and a second frustoconical segment 8b equipped with the opening 19 and connected to the low-pressure compressor 3, it is possible to ensure the entry of the first air stream A1 into the internal passage 18 without piercing the first segment 8a. This meets the mechanical integration constraints of the low-pressure shaft 8 in the turbomachine.

In addition, by eliminating the need for a drilling in the first segment, it is not necessary to provide dynamic seals between this first segment and the high-pressure shaft to limit leakage through this drilling.

The invention claimed is:

1. A turbomachine for an aircraft, the turbomachine extending along a longitudinal axis and comprising:
   a low-pressure compressor comprising a compressor rotor,
   a low-pressure shaft configured to drive the compressor rotor, the low-pressure shaft being centered on the longitudinal axis and having an internal passage configured for the circulation of a first air stream along the longitudinal axis from upstream to downstream, the low-pressure shaft comprising:
   a first cylindrical segment,
   a second segment secured in rotation to the first segment and arranged upstream of the first segment, the second segment comprising a first frustoconical portion connected to the compressor rotor,
   an intermediate casing arranged around the first segment and downstream of the low-pressure compressor,
   at least one bearing configured to guide the low-pressure shaft in rotation, arranged radially between the first segment and the intermediate casing,
   an annular intermediate lubrication chamber wherein said at least one bearing is arranged, the intermediate lubrication chamber being arranged in the intermediate casing,
   an annular air chamber configured to be supplied with air from the low-pressure compressor, the air chamber being delimited axially, at least in part, by the first frustoconical portion and a radial separating wall mounted around the first segment, the first frustoconical portion also having at least one opening putting the air chamber into communication with the internal passage to allow the first air stream to pass from the air chamber to the internal passage.

2. The turbomachine according to claim 1, wherein the air chamber is delimited externally, at least in part, by a first axial wall extending axially upstream from the separating wall and a second axial wall connected to the first frustoconical portion and extending axially downstream, the first and second walls axially delimiting between them an air inlet to allow the first air stream to pass from the low-pressure compressor inside the air chamber.

3. The turbomachine according to claim 2, further comprising a stationary annular air cavity arranged around the air chamber, the air cavity opening into the air chamber and being supplied with air from the low-pressure compressor.

4. The turbomachine according to claim 3, wherein the air cavity is delimited axially, at least in part, by a dynamic seal housed radially between the first axial wall and the intermediate casing, and a dynamic seal housed radially between the second axial wall and the intermediate casing.

5. The turbomachine according to claim 4, further comprising a drainage cavity arranged axially between the intermediate lubrication chamber and the air cavity.

6. The turbomachine according to claim 5, wherein the drainage cavity is delimited axially by the dynamic seal housed radially between the first axial wall and the intermediate casing, and a dynamic seal housed radially between the first axial wall and the intermediate casing and separating the drainage cavity from the intermediate lubrication chamber.

7. The turbomachine according to claim 1, further comprising:
   a high-pressure compressor arranged downstream of the intermediate casing and comprising a compressor rotor,
   a high-pressure shaft arranged coaxially around the first segment of the low-pressure shaft and connected to the compressor rotor, the first segment and the high-pressure shaft delimiting an annular space for the circulation of a second air stream from downstream to upstream, the high-pressure shaft comprising a radial opening into the annular space for the passage of the second air stream from the outside to the inside of the annular space.

8. The turbomachine according to claim 7, further comprising a sleeve arranged around the first segment and inside the intermediate casing, the sleeve being secured to the separating wall and axially delimiting, with an upstream end of the high-pressure shaft, an aperture for the passage of the second air stream from the annular space to the intermediate lubrication chamber.

9. The turbomachine according to claim 1, further comprising:
   a fan movable in rotation about the longitudinal axis and arranged upstream of the low-pressure compressor,
   a fan shaft connected to the fan,
   a speed reducer connecting the fan shaft to the low-pressure shaft, the speed reducer being arranged in an upstream lubrication chamber, and in that the second segment comprises a radial wall extending outwards from the first frustoconical portion and connecting the first frustoconical portion to the compressor rotor, the radial wall having an axial hole for the passage of air from the air chamber to the upstream lubrication chamber.

10. The turbomachine according to claim 1, further comprising:
    a fan movable in rotation about the longitudinal axis and is arranged upstream of the low-pressure compressor,
    a fan shaft connected to the fan,
    a speed reducer connecting the fan shaft to the low-pressure shaft, the speed reducer being arranged in an upstream lubrication chamber, and in that the second segment comprises a second frustoconical portion connected to the speed reducer and to the first frustoconical portion, the second frustoconical portion having a hole opening into the internal passage for the passage of air from the air chamber to the upstream lubrication chamber.

* * * * *